Patented May 5, 1925.

1,536,713

UNITED STATES PATENT OFFICE.

KARL HEUSNER AND MAX SIMON, OF LEVERKUSEN, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PROCESS FOR THE PREPARATION OF DIAZO DERIVATIVES OF AMINOAZO COMPOUNDS.

No Drawing. Original application filed July 24, 1924, Serial No. 727,984. Divided and this application filed February 24, 1925. Serial No. 11,349.

*To all whom it may concern:*

Be it known that we, (1) KARL HEUSNER and (2) MAX SIMON, citizens of Germany, residing at (1) and (2) Leverkusen, near Cologne, State of Prussia, Germany, have invented new and useful Improvements in Processes for the Preparation of Diazo Derivatives of Aminoazo Compounds, of which the following is a specification.

It has been found that the alpha-napthylsulfaminic acid described by Piria (Ann. 78 (1851) p. 31 onwards) as a thionaphthamic acid (in spite of the presence of a markedly acidic sulfuric acid residue in the amino-group) may be combined with diazo-compounds and that the entry of the diazo-group occurs almost quantitatively in the para-position to the sulfamino-group. On the other hand it is well known that when using alpha-naphthylamine that on the average from 5 to 20 per cent of the valueless ortho-compound are produced with the para-compound, according to the choice of the diazotization components and the condition of coupling.

The sulfo-group in these sulfaminoazo bodies can easily be split off by warming in aqueous mineral acid solution and the product further diazotized and coupled with any desired coupling component. The diazo bodies so obtained are of considerably higher value and of greater purity inasmuch as the first combination of the naphthylsulfaminic acid with the diazo compound has occurred substantially in para-position only to the sulfamino-group. It has further been found that the so-called sulfaminoazo compound need not be first saponified for the purpose of further diazotization but that the splitting off of the sulfo-group and the diazotization may be carried out in a single operation. It is, therefore, not always necessary to isolate the sulfaminoazo compounds but in many cases the splitting off of the sulfo-group, diazotization and the coupling can be directly performed in one operation. The process proceeds practically quantitatively. The reaction proceeds as follows:

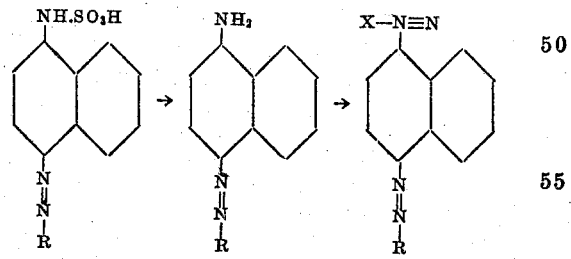

In order to illustrate the new process more fully the following example is given; the parts being by weight:

Example: 17.3 parts of meta-sulfanilic acid are diazotized and coupled with a solution of 24.5 parts of sodium-alpha-naphthylsulfaminate and 20 parts of 100 per cent sodium acetate at about 10° C. The coupling is completed after several hours stirring and a clear brown-yellow solution results. 100 parts of hydrochloric acid (19° Bé.) is added to this solution and heated for a short while. The aminoazo body formed is filtered off, suspended in water and diazotized with 10.5 parts sodium nitrite in hydrochloric acid.

Instead of saponifying and isolating the aminoazo bodies it is also possible to proceed as follows:

The brown-yellow solution obtained above is acidified at about 15° C. with 70 parts of hydrochloric acid (19° Bé.) and treated with a solution of 10.5 parts of sodium nitrite. The unsaponified aminoazo body separates at first by the action of the acid as a dark colored mass but goes into solution on addition of sodium nitrite with a yellow color. After short stirring the separation of the diazo-compound begins. As soon as the separation is complete the diazo body produced is filtered off and may be coupled in the customary manner with any desired dyestuff components.

The formation of the diazo compound takes place practically quantitatively, calculated on the meta-sulfanilic acid whereas without using the sulfaminic acid the diazo compound obtained from the coupling product of meta-diazo-benzene, sulfonic acid and alpha-naphthylamine leads only to a yield of 80%. These reactions can be formulated as follows:

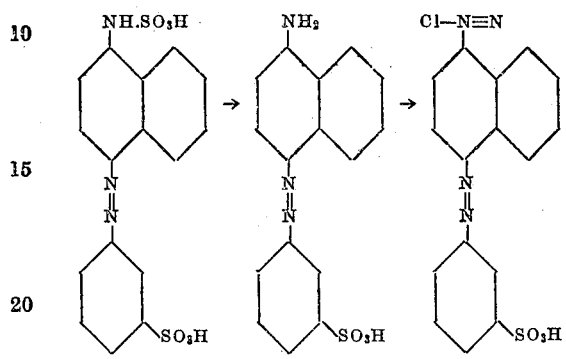

Instead of meta-sulfanilic acid other sulfonated, carboxylated and substituted derivatives of the benzol, naphthalene, anthracene, anthraquinone and diphenyl series may be used. Furthermore, unsulfonated and non-carboxylated compounds of the aforementioned kind are just as suitable for this process. Among such products we mention aniline, aminophenolethers, monoacidylphenylenediamines, chloranilines and their homologues, alpha- or beta-naphthylamine, diaminodiphenyl derivatives, the homologues of these amines, etc.

Trisazo-compounds may also be prepared by further coupling of these diazo bodies with alpha-naphthylsulfaminic acid, saponification, diazotization and further coupling.

The above described process of diazotizing sulfaminoazo compounds without previous saponification can also be carried out on the fibre. Dyestuffs prepared from benzidine derivatives with alphanaphthylsulfaminic acids are substantive, that is to say have direct affinity to vegetable fibres; in this case it is possible to diazotize cotton material dyed with these goods by treating same directly with diluted mineral acids and sodium nitrite. The diazo compounds affixed to the fibre are then developed in known manner.

The present application is a division of application No. 727,984 filed July 24, 1924.

We claim:

1. In processes of preparing alpha-diazo-naphthalene-alpha-azo compounds the steps comprising coupling diazo compounds with alpha-naphthylsulfaminic acids, splitting off the sulfo-group of the naphthylsulfaminic acid and diazotizing in acid solution with alkali-metal-nitrites.

2. In processes of preparing alpha-diazo-naphthalene-alpha-azo compounds, the steps comprising coupling a diazo compound with alphanaphthylsulfaminic acid and treating same in aqueous solution with an acid and an alkali-metal-nitrite.

3. In processes of preparing alpha-diazo-naphthalene-alpha-azo compounds, the steps comprising coupling a diazo compound with alphanaphthylsulfaminic acid and treating same in aqueous solution with a mineral acid.

In testimony whereof we have hereunto set our hands.

KARL HEUSNER.
MAX SIMON.